United States Patent [19]
Lai

[11] 4,069,111
[45] Jan. 17, 1978

[54] METHOD OF ELECTROCHEMICALLY FORMING A LITHIUM SILICON IRON ALLOY ELECTRODE

[75] Inventor: San-Cheng Lai, Woodland Hills, Calif.

[73] Assignee: Rockwell International Corporation, El Segundo, Calif.

[21] Appl. No.: 772,783

[22] Filed: Feb. 28, 1977

Related U.S. Application Data

[62] Division of Ser. No. 715,358, Aug. 18, 1976.

[51] Int. Cl.$^2$ .................................................. C25D 5/00
[52] U.S. Cl. ...................................................... 204/39
[58] Field of Search ....................................... 204/39, 71

[56] References Cited
U.S. PATENT DOCUMENTS

| | | | |
|---|---|---|---|
| 2,786,809 | 3/1957 | Raynes | 204/39 |
| 3,489,659 | 1/1970 | Cook et al. | 204/39 |

*Primary Examiner*—John H. Mack
*Assistant Examiner*—H. A. Feeley
*Attorney, Agent, or Firm*—L. Lee Humphries; Henry Kolin; Clark E. DeLarvin

[57] ABSTRACT

An improved lithium electrode structure comprises an alloy of lithium, silicon, and iron in specified proportions and a supporting current-collecting matrix in intimate contact with said alloy. The lithium electrode of the present invention is utilized as the negative electrode in a rechargeable electrochemical cell.

3 Claims, 5 Drawing Figures

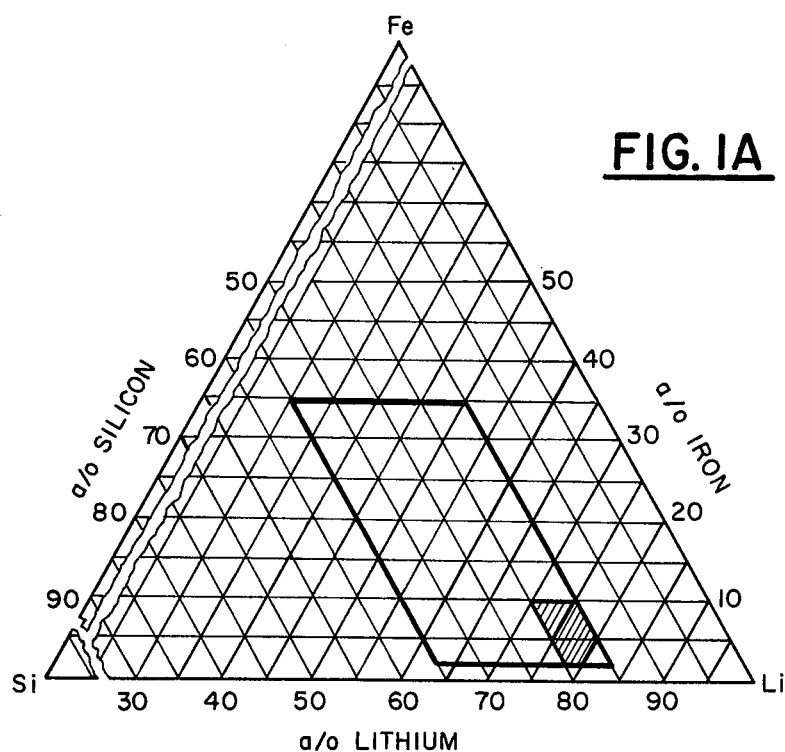
FIG. IA
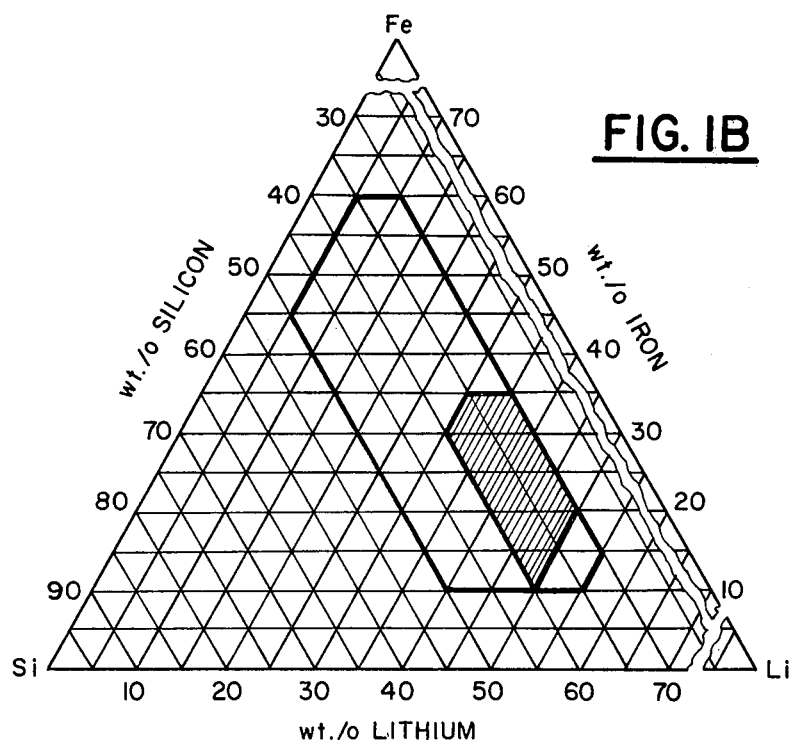
FIG. IB

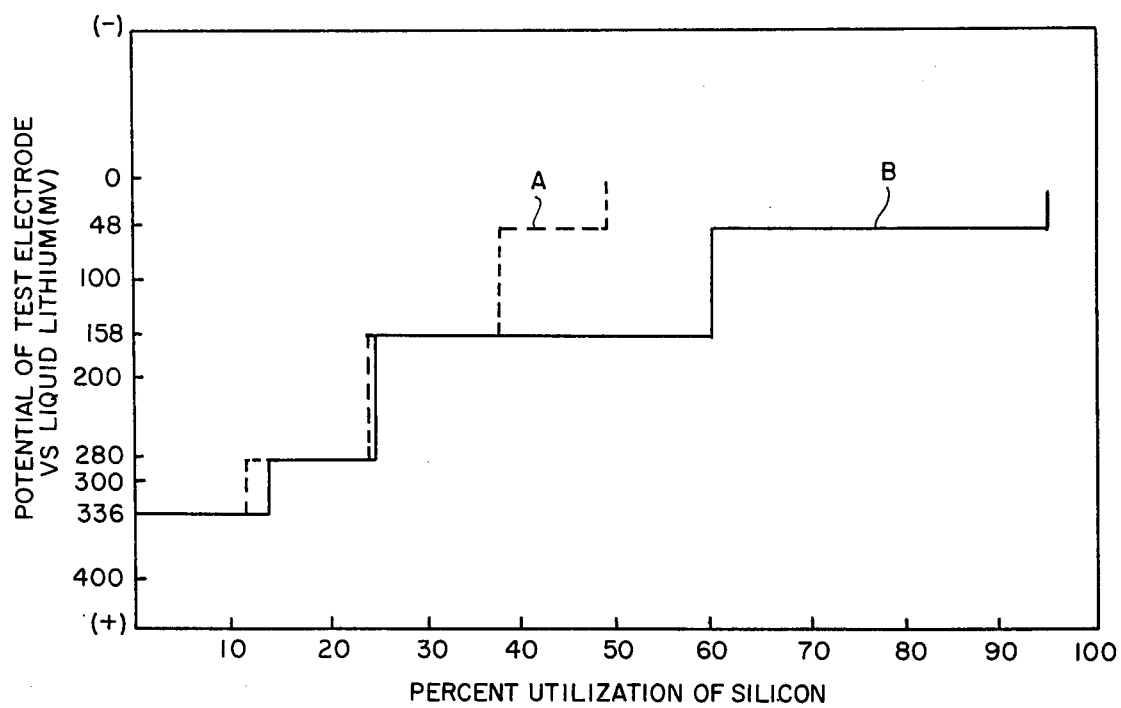
FIG. 2
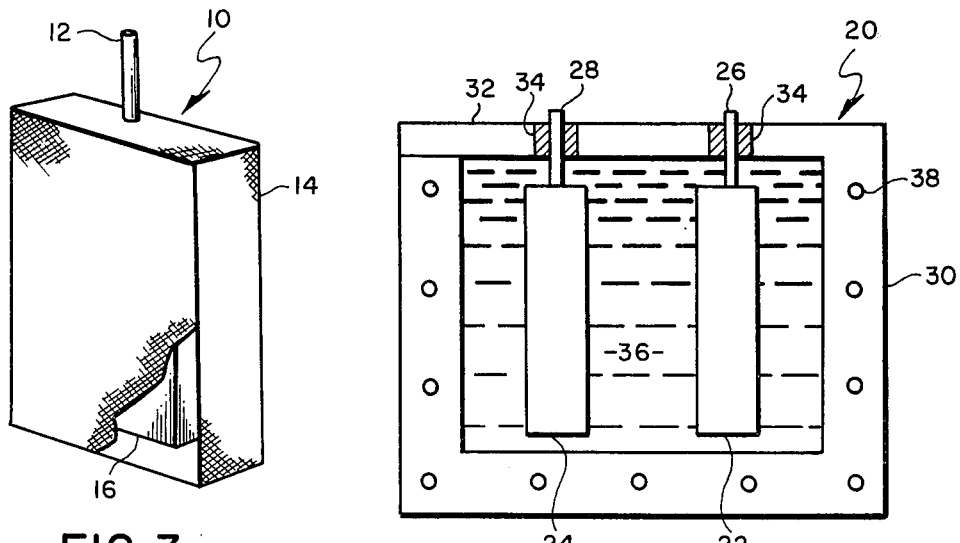
FIG. 3
FIG. 4

METHOD OF ELECTROCHEMICALLY FORMING A LITHIUM SILICON IRON ALLOY ELECTRODE

CROSS REFERENCE TO RELATED APPLICATION

This application is a division of application Ser. No. 715,358, filed Aug. 18, 1976.

BACKGROUND OF THE INVENTION

1. Field of the Invention

The invention broadly relates to electrical energy storage devices and more particularly to a lithium electrode structure and a secondary electrochemical cell utilizing such an electrode.

2. Prior Art

Two approaches generally have been followed in the construction of a lithium electrode for use in an electrical energy storage device, such as a rechargeable battery, particularly one employing a molten salt electrolyte. In one approach, the lithium is alloyed with another metal such as, for example, aluminum to form a solid electrode at the operating temperature of the cell. In the other approach, liquid lithium is retained in a foraminous metal substrate by capillary action. Heretofore, the latter approach has been preferred because it offers higher operating cell voltages and therefore potentially higher battery energy densities. Certain problems are encountered, however, when it is attempted to retain molten lithium in a foraminous metal substrate. More particularly, most metals which are readily wetted by lithium are too soluble in the lithium to permit their use as the metal substrate, whereas most metals structurally resistant to attack by molten lithium are poorly wetted by the lithium when placed in a molten salt electrolyte.

It has been suggested that metals structurally resistant to attack by molten lithium may be wetted by immersion in molten lithium maintained at a high temperature. However, the structure so wetted by lithium at these higher temperatures usually undergoes progressive dewetting when used as the negative electrode in a secondary battery containing a molten salt electrolyte maintained at the substantially lower temperatures at which such a battery operates. Thus after operation of the battery for a number of cycles, it has been found that lithium no longer preferentially wets the substrate, the electrode progressively losing capacity. Various methods have been proposed in an attempt to overcome this problem. See, for example, U.S. Pat. Nos. 3,409,465 and 3,634,144. None of the proposed methods have proven entirely satisfactory.

The use of a solid lithium alloy as taught by the prior art also is not without problems. More particularly, lithium-aluminum alloy, for example, is approximately 300 millivolts more positive than liquid lithium. Thus, electrochemical cells utilizing lithium-aluminum alloys as electrodes are not able to achieve the same potentials as those utilizing liquid lithium electrodes. Further, in a molten salt electrolyte, the lithium-aluminum alloy electrode expands and contracts greatly during charging and discharging of the electrochemical cell. Thus, it has been reported that the lithium-aluminum electrode may change in volume by as much as 200% during charging and discharging of the cell. Still further, lithium-aluminum alloys generally are limited to a lithium content of less than about 30 wt.%.

Various other materials have been suggested for use as an alloy with lithium to form a solid electrode. In U.S. Pat. No. 3,506,490, for example, it is suggested that the lithium be alloyed with either aluminum, indium, tin, lead, silver, or copper. However, none of these materials have been proven to be completely satisfactory. More particularly, these other suggested materials, such as tin and lead for example, form alloys containing lesser amounts of lithium than does aluminum, and thus have a still lower capacity (ampere-hours) per unit weight of alloy. Further, the potential of these other alloys compared with liquid lithium is more positive than that of a lithium-aluminum alloy; thus, alloys of such other materials are less desirable. Other patents relating to solid lithium anodes include U.S. Pat. Nos. 3,506,492 and 3,508,967.

As a means of resolving some of the foregoing problems, I have provided in U.S. Pat. No. 3,969,139 and electrode structure utilizing an alloy of lithium and silicon, this electrode being of particular utility as the negative electrode in a rechargeable lithium-metal sulfide molten salt cell. Such an electrode provides excellent lithium retention, significantly reduced corrosion, and provides twice the energy capacity of the lithium-aluminum electrode. However, it has been found that in electrochemically forming the lithium-silicon alloy electrode, not all the silicon is utilizable in the electrochemical forming process, thereby requiring a greater amount of silicon for a given ampere-hour capacity. Also, when utilized at higher current densities, the lithium-silicon alloy electrode tends to become polarized during electrochemical transfer of lithium into and out of the electrode. Accordingly, the need still exists for an improved lithium electrode which retains the advantageous features of the lithium-silicon alloy electrode while at the same time mimimizing or eliminating the disadvantageous features thereof.

SUMMARY OF THE INVENTION

Broadly, the present invention provides an improved lithium electrode, compared with the lithium-aluminum and lithium-silicon alloy electrodes, and an electrical energy storage device such as a secondary battery or rechargeable electrochemical cell utilizing such electrode. The improved electrode comprises a ternary alloy of lithium, silicon, and iron in intimate contact with a supporting current-collecting matrix. The formed or fully charged alloy may be represented by the empirical formula $Li_xSiFe_y$, where $x$ may have any value from 1 to 5 and $y$ may have any value from 0.125 to 1. For preferred alloy compositions, x has a value from 4 to 5 and Fe has a value from 0.125 to 0.5, all ranges stated being inclusive.

It has been uniquely found that the ternary alloy electrode may be electrochemically formed starting with a ferrosilicon alloy, substantially complete utilization of the silicon present being obtained during the forming process. Thereby less silicon will be required to obtain an electrode having a given ampere-hour capacity compared with electrochemical forming when starting with silicon metal alone. Also, because the ferrosilicon is much more conductive than silicon, polarization is minimized so that a greater ampere-hour capacity is available at higher current densities without any deterioration in output voltage or capacity during repeated cycling. Since the presence of iron facilitates the electrochemical utilization of the silicon and also provides for a decrease in electrode polarization, but at the same time is electrochemically inert with respect to the cell process, it will be appreciated that the amount of iron present in the formed electrode, as well as that of silicon, will be kept to a minimal value consistent with that required for obtaining the improved advantageous features of the present lithium alloy electrode.

The improved electrical energy storage device preferably comprises a rechargeable lithium battery having positive and negative electrodes spaced apart from one another and in contact with a suitable lithium-ion-containing electrolyte, preferably a molten salt electrolyte. The improved lithium electrode of the present invention is utilized as the negative electrode, functioning as the cell anode during the discharge mode of the cell.

BRIEF DESCRIPTION OF THE DRAWING

FIGS. 1A and 1B show on a triangular coordinate scale the Li-Si-Fe alloy system of the present invention;

FIG. 2 is a graphical comparative representation of the typical charge characteristics in the electroforming of Li-Si and Li-Si-Fe alloy electrodes;

FIG. 3 is a pictorial view in perspective of an electrode of the present invention; and FIG. 4 is a diagrammatic representation of an electrical energy storage device of the present invention.

DESCRIPTION OF THE PREFERRED EMBODIMENTS

The lithium electrode of the present invention in its boradest aspects comprises a ternary alloy of lithium, silicon, and iron in intimate contact with a supporting current-collecting matrix, thereby generally providing a unitary or composite electrode structure. The term "alloy" as used herein is defined as an intimate mixture of the three metals in which the metals may form mixed crystals, solid solutions, or chemical compounds. The metals also may be present in more than one of these states in the same alloy. For convenience in characterizing and describing the ternary alloy, reference will be made to the composition of the alloy based on weight percentages, atom percentages, and exemplary empirical formulas.

In Table 1 five alloy compositions are shown, based on the empirical formula $Li_xSiFe_y$, where $x$ may have any value from 1 to 5 and $y$ may have any value from 0.125 to 1, inclusive. For the four preferred alloy compositions shown, $x$ has a value from 4 to 5 and Fe has a value from 0.125 to 0.5. Also shown in this table are the atom percentages and weight percentages for lithium, silicon, and iron corresponding to the alloy compositions shown.

In Table 2 are summarized the overall composition range and the preferred compositions, both in terms of weight percent and atom percent, for the ternary alloy. Referring to FIG. 1 of the drawing, the enclosed area in the composition diagram of FIG. 1A corresponds to the atom percent range for the ternary alloy compositions shown in Table 2, the preferred ternary alloy range being shown cross-hatched, and corresponding to 70-80 Li, 15-20 Si, and 2-10 Fe, all in atom percent. Similarly, in FIG. 1B is shown the composition range in terms of weight percent, the preferred composition range being shown cross-hatched and corresponding to 30-50 Li, 30-40 Si, and 10-35 Fe, all in weight percent. It will be appreciated that the empirical formulas shown and the atom and weight percentages referred to herein after to the lithium electrode in its formed or fully charged state, since obviously in operation of the cell the lithium will be discharged, resulting in an alloy of substantially less or even no lithium content.

For certain special applications, depending particularly on the temperature of use and the nature of the electrolyte with which the electrode will be in contact, it is contemplated that the lithium alloy electrode may be self-supporting. However, for most applications,

TABLE 1
Li-Si-Fe COMPOSITIONS

| Empirical Formula | Atom Percent | | | Weight Percent | | |
|---|---|---|---|---|---|---|
| | Li | Si | Fe | Li | Si | Fe |
| $LiSiFe$ | 33.3 | 33.3 | 33.3 | 7.6 | 30.9 | 61.5 |
| $Li_4SiFe_{0.5}$ | 72.7 | 18.2 | 9.1 | 33.1 | 33.5 | 33.3 |
| $Li_4SiFe_{0.25}$ | 76.2 | 19.0 | 4.8 | 39.8 | 40.2 | 20.0 |
| $Li_5SiFe_{0.5}$ | 76.9 | 15.4 | 7.7 | 38.2 | 31.0 | 30.8 |
| $Li_5SiFe_{0.125}$ | 81.6 | 16.3 | 2.1 | 49.7 | 40.3 | 10.0 |

TABLE 2
SUMMARY OF Li-Si-Fe COMPOSITION RANGES

| | Atom Percent | | | Weight Percent | | |
|---|---|---|---|---|---|---|
| | Li | Si | Fe | Li | Si | Fe |
| Overall Range: | 30-83 | 15-35 | 2-35 | 5-55 | 30-50 | 10-60 |
| Prefered Range: | 70-80 | 15-20 | 2-10 | 30-50 | 30-40 | 10-35 | particularly where the lithium alloy electrode is in contact wtih a molten salt electrolyte at elevated temperatures, the lithium-alloy electrode structure further includes a supporting current-collecting matrix in intimate contact with the alloy. Suitable materials for the supporting current-collecting matrix are those materials resistant to attack by lithium or lithium-silicon-iron mixtures. Examples of such materials include iron, steel, stainless steel, molybdenum, nickel, titanium, tantalum, and zirconium. The purpose of providing a matrix in intimate contact with the alloy is to provide for substantially uniform current density throughout the alloy and also to provide structural support for the alloy. It has been determined that the lithium-silicon-iron alloy utilized in the present invention generally lacks structural integrity when used in an electrical energy storage device as the mole component of the negative electrode, particularly in a molten salt electrolyte at its high operating temperature. To function for any significant length of time without disintegration, therefore, it is preferable if not actually essential that the lithium alloy be provided with a supporting matrix. It is contemplated and preferred, within the scope of this invention, that the support and current-collecting capability be provided by a single structure; however, the support may be provided by one structure and the current-collecting capability by another separate structure.

The matrix may be in the form of an electronically conductive porous substrate having an apparent density of from about 10 to 30 percent of that of the base material. Advantageously, the substrate will have a median pore size within the range of from about 20 to 500 microns and preferably from about 50 to 200 microns. A particularly preferred form of such a substrate is formed from woven or non-woven wires pressed together to a desired apparent density and then sintered. Such pressed and sintered wire structures are known and commercially available as Feltmetals. The porous substrate then is impregnated with the alloy, for example, by immersion in a molten bath of the alloy followed by removal and cooling. Alternatively, the alloy may be cast about a matrix formed from a wire screen or expanded metal.

In another variation, the matrix structure may be in the form of a perforate container formed from wire screen or the like, and containing therein a body of the alloy alone. Alternatively, the alloy is in intimate contact with a porous substrate enclosed in the perforate container, it being desirable that the container and the substrate be in electrical contact with one another. This latter variation is particularly useful when the porous substrate is formed from very fine woven or non-woven wires pressed together to form a body.

More particularly, it has been found, at least in the case of iron used as the substrate material, that if the wire used to form the porous substrate has a diameter of less than about 10 microns, the substrate tends to break up and disintegrate upon repeated charging and discharging of the electrode in a molten salt electrolyte. It is not known with certainty whether such destruction is the result of imperceptible expansion and contraction of the electrode or the occurrence of a chemical interaction. In selecting material for use as a substrate, therefore, consideration should be given by any chemical reaction or corrosion that may occur as a result of the specific electrolyte or matrix material which is utilized. Further, if the matrix comprises woven or non-woven wires pressed together to provide a porous substrate, the wire should have a diameter of at least about 10 microns. Advantageously, the wire diameter will be from about 10 to about 500 microns and preferably from about 10 to 200 microns.

A particularly suitable supporting current-collecting matrix electrode structure that may be utilized in the present invention is shown in co-pending application Ser. No. 667,001 filed Mar. 15, 1976 and now U.S. Pat. No. 4,003,753, assigned to the Assignee of the present invention, said application being hereby incorporated by reference. Broadly, this matrix structure comprises a unitary multi-cell structure including a plurality of wall members having edges and axially extending surfaces which form a plurality of cells having at least one open end, said cells having a cross-sectional area of at least about 0.04 cm$^2$. The edges of the wall members in the open end of the cells are aligned in a common plane to form a planar face. Generally the electrode structure will have a planar face having a surface area of from about 25 to 300 cm$^2$. The axially extending surfaces of the wall members are substantially perpendicular to the planar face. The body of electrochemically active alloy material is disposed in the cells, being retained in place by an electrolyte-permeable member which is affixed to the wall members and covers the open end of the cells. The type of matrix electrode structure may also be utilized for containing a body of electrochemically active positive electrode material.

The multi-cell matrix structure is essentially a macroporous or open-faced cellular structure. The individual cells may take various forms, however, such as squares, diamond shapes, rectangular, circular, octagonal, or indeed just about any geometric shape. Further, the individual cells may or may not share a common wall. The particularly preferred form is one in which the individual cells are hexagonal in shape, sharing a common wall to form a honeycomb structure. This preferred shape optimizes the void volume for retention of active material while at the same time providing a high strength-to-weight ratio. In some instances, however, other less complex forms such as square-shaped cells may be preferred for economic reasons. An advantage of this matrix structure over the prior art porous matrix structures is the ease with which it can be uniformly loaded with active materials.

The cell depth of the multi-cell structure is not particularly critical. Generally, it has been found that good utilization of the electrochemically active positive or negative electrode material is attainable with cells having a depth of from about 0.1 to 2.0 cm and preferably from about 0.5 to 1.0 cm. It will be appreciated, however, that the depth of the cell and thickness of the wall members of the multi-cell structure should be such as to provide structural integrity and resist warping. Particularly good results have been obtained with respect to effective utilization of active material and structure integrity when the ratio of the open cross-sectional area of the cell to the depth of the cell is maintained within a range of from about 1:1 to 2:1 and the wall members of the cell have a thickness within the range of from about 0.002 to 0.05 cm, preferably from about 0.002 to about 0.02 cm.

The particular material selected for the electrode structure of the present invention is not critical except insofar as it must be one which is not attacked or corroded by the molten electrolyte during normal operation of the device. Generally, iron, steel, nickel, or nickel steel alloys are preferred on the basis of cost for containing the Li-Si-Fe alloy material. Molybdenum and tantalum are preferred on the basis of their corrosion resistance.

The electrolyte-permeable member may be conductive or non-conductive and fills two functions: (1) to permit free passage of charged ions and electrolyte into and out of the cells, and (2) to retain the active material in the cell. It has been found that the structure integrity of this matrix electrode structure is greatly enhanced when the electrolyte-permeable member is fixedly attached to the wall members, preferably at the edges of the wall members, for example, by welding, brazing, or diffusion bonding.

In a particularly preferred embodiment, the electrolyte-permeable member is formed from a wire screen wherein the individual wires have a diameter of from about 0.002 to 0.02 cm, the opening in the electrolyte-permeable member should have a cross-sectional area within the range of from about $1 \times 10^{-6}$ to $1 \times 10^{-3}$ cm$^2$, and there should be provided from about $10^5$ to $10^2$ openings per square centimeter. The electrolyte-permeable member preferably is made from the same material as the wall members. In addition to screens, other forms which may be used are porous sintered plaques, perforate plates, and the like. While the wire screen is applicable to both positive and negative electrode structures because of its low cost, these other forms also may be used. When a porous plaque such as porous nickel, iron or the like is used, it should have an apparent density of from about 20 to 60% of that of the base metal and an average pore size of from about 1 to 20 microns.

In one embodiment of the invention, the electrode is formed by surrounding the matrix with the alloy in a molten state, for example, by immersing a porous substrate in a molten body of the ternary alloy. The alloy may be formed by mixing particulate lithium, silicon, and iron and heating such a mixture to a sufficiently elevated temperature to form a melt. In accordance with a preferred method however, the lithium first is heated, in an inert atmosphere, to a temperature above the melting point of lithium, and thereafter an iron silicide, typically a ferrosilicon, is added in an amount to provide the desired weight percent for the ternary alloy. In such latter method, the exothermic reaction between the lithium and the ferrosilicon will provide substantially all of the heat required to form a melt of the alloy.

It is particularly advantageous and preferred that the present lithium alloy electrode be formed electrochemically in a molten salt electrolyte in generally the same manner as known and utilized in forming lithium-aluminum and lithium-silicon electrodes. See, for example, U.S. Pat. Nos. 3,947,291 and 3,969,139, respectively. In the present invention, assembling a cell with at least the negative electrode, and preferably both electrodes, in the "uncharged" state is particularly desirable because of the substantially complete utilization of silicon obtained. Specifically, ferrosilicon in intimate contact with the supporting current-collecting matrix and a mixture of lithium sulfide and iron as uncharged positive electrode are immersed in a molten salt electrolyte containing a source of lithium ions, and the lithium is coulometrically charged into the electrode in an amount to form the desired alloy. At the same time iron sulfide is being formed as the positive electrode.

Ferroalloys containing 6–95 wt.% Si (ferrosilicon; iron silicides) are commercially available, being extensively used by the iron and steel industry. The range of preferred ferrosilicon alloys utilizable in the practice of the present invention is shown in Table 3.

The iron silicides may contain minor amounts of impurities such as, for example, calcium, magnesium, chromium, cerium, manganese, aluminum, carbon, and zirconium. Also, the use for certain applications of magnesium ferrosilicon (44–48% Si, 8–10% Mg, 1.00–1.50% Ca, 0.50% Ce, all wt.%) is considered particularly desirable since it has been observed that only iron silicide and magnesium silicide ($MgSi_2$) are able to fully utilize substantially all of the silicon in forming the lithium alloy negative electrode. Although not considered as suitable as iron silicide, the use of magnesium silicide, alone or in admixture with iron silicide, as starting material is contemplated because of its substantially complete utilization of silicon during the forming process and its lower atomic weight compared with iron. However, the ternary lithium-silicon-magnesium alloy when used as the negative electrode shows a voltage drop compared with the ternary lithium-silicon-iron alloy.

It is not clear from a theoretical basis why iron and magnesium silicides are able to form a suitable ternary alloy with lithium, achieving almost complete utilization of silicon, compared for example with molybdenum silicide which does not form a suitable lithium alloy. Although applicant

TABLE 3

| FERROSILICON ALLOYS | | | | |
|---|---|---|---|---|
| Empirical | Atom Percent | | Weight Percent | |
| Formula | Fe | Si | Fe | Si |
| FeSi | 50 | 50 | 66.5 | 33.5 |
| $FeSi_2$ | 33 | 67 | 49.9 | 50.1 |
| $FeSi_8$ | 11.1 | 88.9 | 19.9 | 80.1 | does not wish to be limited in this regard to the following proffered explanation, it is believed that because of the weaker bonding between the iron and silicon linkages or between the magnesium and silicon linkages there is a negative free energy of formation of the lithium compound, such as $(Li_4Si)_2Fe$, thereby promoting the reaction, compared with the free energy of formation of a compound such as $(Li_4Si)_2Mo$ which is postulated as positive and therefore this compound will not readily be formed. Somewhat surprisingly, as noted in Examples 4 and 5, of the metal silicides evaluated only iron and magnesium silicides were able to form the ternary lithium alloy with substantially complete utilization of the silicon present.

The present invention also provides an electrical energy storage device, particularly a secondary cell or battery, which includes the lithium electrode of the present invention as the electrically regenerable negative electrode, a positive electrode, and an electrolyte.

The positive electrode or cathode is an electron acceptor and contains an active material which is electropositive with respect to the lithium electrode. The active material of the cathode may be sulfur or a metal halide, sulfide, oxide or selenide. Suitable metals include copper, iron, tungsten, chromium, molybdenum, titanium, nickel, cobalt, and tantalum. The sulfides of iron and copper are particularly preferred for use with molten salt electrolytes. The cathode may be formed entirely of the active material or may comprise a composite structure such as a holder of, for example, graphite containing a body of such active material, or the multicell matrix electrode structure previously described.

The electrolyte utilized in preferred cell embodiments is a lithium-ion-containing molten salt electrolyte; alternatively, for certain particular cell systems, a solid electrolyte, an organic solvent electrolyte or an aqueous electrolyte is utilizable.

The term "molten salt electrolyte" as used herein refers to a lithium halide-containing salt which is maintained at a temperature above its melting point during operation of the electrical energy storage device. The molten salt may be either a single lithium halide, a mixture of 1 thium halides, or a eutectic mixture of one or more lithium halides and other alkali metal or alkaline earth metal halides.

Typical examples of binary eutectic salts are lithium chloride-potassium chloride, lithium chloride-magnesium chloride, lithium chloride-sodium chloride, lithium bromide-potassium bromide, lithium fluoride-rubidium fluoride, lithium iodide-potassium iodide, and mixtures thereof. Two preferred binary salt eutectic mixtures are those of lithium chloride and potassium chloride (melting point 352° C), and lithium bromide and rubidium bromide (melting point 278° C).

Examples of ternary eutectics useful as the molten salt electrolyte include calcium chloride-lithium chloride-potassium chloride, lithium chloride-potassium chloride-barium chloride, calcium chloride-lithium chloride-barium chloride, and lithium bromide-barium bromide-lithium chloride. Preferred ternary eutectic mixtures include those containing lithium-chloride, lithium fluoride and lithium iodide (melting point 341° C) and lithium chloride, lithium iodide and potassium iodide (melting point 260° C).

The suitable alkali or alkaline earth metal ion should have a deposition potential very close to or preferably exceeding deposition potentials of lithium ion in the electrolyte. Lithium halide salts can be readily combined with halides of potassium, barium, and strontium. Halides of metals such as cesium, rubidium, calcium, or sodium may be used, but a substantial proportion of these metals may be co-deposited with the lithium when the electrode is charged, with a resulting small loss in potential.

Although the ternary eutectic salt mixtures, particularly those containing the iodides, provide lower melting points, the binary eutectic mixture of lithium chloride-potassium chloride sometimes is preferred on the basis of its lower cost and availability, particularly for batteries to be used in large scale applications such as electric powered vehicles and electric utility bulk energy storage.

If desired, a lithium chalcogenide corresponding to the chalcogenide of the positive electrode is added to the molten salt. Thus, when the positive electrode material is a sulfide or oxide, $Li_2S$ or $Li_2O$ is added, respectively, to the molten salt. It has been found that if a saturating amount of the lithium sulfide (about 0.1 wt.%) or lithium oxide (about 0.4 wt.%) is added to the fusible salt electrolyte, long-term cell performance is enhanced.

The solid state electrolytes contemplated herein include a mixture of lithium sulfate and a lithium halide such as lithium chloride or lithium bromide or a mixture thereof. The composition of the mixed salt solid electrolyte may vary from 10 to 95 mole % lithium sulfate. Solid electrolytes having such composition are conductive in what appears to be a solid phase at temperatures as low as about 400° C.

The lithium electrode of the present invention also is useful in electrical energy storage devices, particularly primary cells, which utilize a lithium-ion source in an organic solvent. The term "organic electrolyte" contemplates those non-aqueous electrolytes which comprise an organic solvent and a solute. The solute is the source of lithium cations. The solute also is, of course, miscible or dissolved in the organic solvent. The solvent is such that it does not attack the electrode materials and is not affected by them. Obviously the solute should be stable in its environment at the intended operating temperature and electrical potential. Organic electrolyte cells generally are designed to operate at a temperature below about 125° C, and more specifically, at a temperature within the range of from about 0° to 80° C. It is important that the solute and the solvent be such as to provide a lithium ion-containing and conducting medium which is mobile or liquid under these conditions. Normally, it is preferred that the solute be of high purity.

The solutes which most nearly meet these requirements are lithium halide salts. For conductivity purposes, other metal halides, e.g., aluminum chloride, are often complexed with the lithium halide. The halide is selected from the group consisting of chlorine, fluorine, bromine, iodine, and mixtures thereof. It is envisioned that double anion complexes also could be used. Examples of suitable solutes are lithium bromide, lithium chloride, lithium fluoride, sodium chloride, sodium fluoride, and potassium chloride. The lithium salt also may be a lithium perchlorate, hexafluophosphate, tetrafluoborate, tetrachloroaluminate, or hexafluoarsenate.

Preferably, the lithium ion-containing and conducting medium used is in a saturated or supersaturated condition. The ion-containing and conducting medium should have sufficient salt concentration to permit most economical operation of the cell. The ion-containing and conducting medium should have a concentration of solutes greater than about 0.5 molar.

The choice of organic solvent for the ion-containing and conducting medium is dictated by many of the considerations involving the solute. The solvent of the ion-containing and conducting medium is any polar material which meets the requirements of serving as a transfer medium for the solute and in which the solute is miscible or dissolved. The solvent also should be of such a material as to be inert to the electrode materials. The solvent is preferably a liquid at from about 0°-125° C; operating conditions dictate such a requirement. For example, dimethylsulfoxide is an excellent solvent above its melting point of about 18.5° C. The solvent is desirably one which does not readily release hydrogen ions. Solvents of high dielectric constants and low viscosity coefficients are preferred.

Suitable solvents are, for example, the nitriles such as acetonitrile, propionitrile, sulfoxides such as dimethyl-, dietyl-, ethylmethyl-, and benzylmethylsulfoxide; pyrrolidones such as N-methylpyrrolidone, and carbonates such as propylene carbonate.

The anodic reaction of alkali metals in aqueous electrolytes in an electrochemical cell to produce electrical energy is also known. Of particular interest is a high-energy lithium-water primary cell, which utilizes a lithium or lithium alloy anode, an inert cathode such as platinum, nickel, or silver oxide, and an aqueous alkali metal hydroxide electrolyte, such as sodium hydroxide or potassium hydroxide. The lithium alloy electrode of the present invention is considered as suitable for use as an anode in such a lithium-water primary cell system.

In addition to the foregoing representative list of suitable electrolytes and positive electrode materials, many others will be apparent to those versed in the art. It is not intended that the invention be limited, therefore, only to those specifically identified.

Referring now to FIG. 1 of the drawing, there is shown a graphical comparison of the typical charge characteristics in the electroforming of Li-Si (Curve A) and Li-Si-Fe (Curve B) alloy electrodes. The percent utilization of silicon is shown starting with equivalent amounts of silicon as present in silicon powder and in ferrosilicon ($FeSi_2$) in an LiCl-KCl eutectic molten salt at 400° C starting with maximum charging potential (336 mv) and continuing until substantially complete electrode formation, approaching zero potential, using a liquid lithium counterelectrode. As may be noted from FIG. 2, both the Li-Si and Li-Si-Fe electrodes are formed by being charged through four distant voltage plateaus, the final plateau of 48 mv being below the potential of liquid lithium.

The reason for such a series of different potentials is not known with certainty, and the present invention is not to be considered as limited by any particular theory. It is believed, however, that the different plateaus represent specific species of lithium alloy compounds. Obviously, knowledge of the precise mechanism involved is not necessary for the practice of the present invention.

Referring to Curve A, which shows the preparation of an Li-Si electrode starting with silicon, it is noted that electroformation of this electrode is completed at a percentage utilization of silicon of about 48%. Therefore, for electrodes of an equivalent electrochemical capacity, about twice the amount of silicon would be required. This means that effectively about half the silicon present in the Li-Si electrode structure is not being electrochemically utilized. Further, because of the relatively poor conductivity of silicon, this tends to increase the internal cell resistance and result in polarization phenomena at various elevated current densities.

By contrast, referring to Curve B, which shows the formation of an Li-Si-Fe electrode starting with $FeSi_2$, electrochemical formation is completed with utilization of the silicon in excess of 90%. Thereby, compared with Li-Si, a greater volume density is obtained with the Li-Si-Fe alloy as well as a lower resistivity of the final alloy, since any excess ferrosilicon is of relatively low resistance.

It also will be noted in comparing the two curves that both alloys are formed to substantially the same potential, which is below that of liquid lithium. At the liquid lithium potential, it is possible that the release of free lithium into the electrolyte may occur. However, it should be noted that even where it is desired to completely eliminate such a possibility by electroforming to a lower plateau than that of liquid lithium, in all instances the percent utilization of silicon for the Li-Si-Fe alloy is usually significantly greater at equivalent plateaus than for the Li-Si alloy. Also, to guard against the possibility of free lithium being present, the Li-Si-Fe alloy having a lower lithium atom percent may be formed such as that corresponding to $Li_4SiFe_{0.5}$ (atom % Li is 72.7) rather than $Li_5SiFe_{0.125}$ (81.6 atom % Li).

Referring now to FIG. 3, a lithium electrode 10 of the present invention is shown. The electrode 10 includes a conductor wire 12 and a cage or a perforate container matrix formed from a wire screen 14 and a porous substrate impregnated with a lithium-silicon-iron alloy 16. Alternatively, the multi-cell honeycomb structure shown in copending application Ser. No. 667,001, filed Mar. 15, 1976, may be used as the matrix structure.

In FIG. 4 is depicted an electrical energy storage device 20 which utilizes the lithium alloy electrode of the present invention. The storage device 2 includes a positive electrode 22 and a negative electrode 24, the latter comprising a porous metal substrate impregnated with a lithium-silicon-iron alloy. Electrodes 22 and 24 are provided with electrical connectors 26 and 28, respectively. The electrical energy storage device also includes a housing 30 and a cover 32. The cover 32 is provided with apertures therethrough for electrical connectors 26 and 28. Located within the apertures are electrically nonconductive insulators 34. The electrical energy storage device also includes an electrolyte 36. When the electrolyte is a solid electrolyte or a molten salt electrolyte, both of which must operate at relatively high temperatures, housing 30 also may be provided with heating means such as a plurality of electrical resistance heaters 38.

The following examples are set forth for the purpose of illustrating the present invention in greater detail, but are not to be considered as limitations thereof. Thus the examples principally relate to use of the electrode of the present invention in a molten salt electrolyte which is preferred. However, the invention should not be construed as limited to electrical energy storage devices utilizing only a molten salt electrolyte, for, as herein disclosed, it will also have utility in an electrical energy storage device utilizing either a solid electrolyte, an organic electrolyte, or an aqueous electrolyte

EXAMPLE 1

Lithium-silicon electrodes were prepared from an initially "uncharged" condition by electrochemically charging lithium into silicon powder held in a honeycomb support structure. In all cases, poor silicon utilization (40%) was obtained.

By way of comparison, commercially obtained ferrosilicon alloy, $FeSi_2$, 99.5% pure, was loaded into a small honeycomb electrode (1 in. × ¾ in. × 3/16 in. deep) to give a theoretical capacity of 2.3 ampere-hours (1.0 $ah/cm^3$) when charged to $Li_5SiFE_{0.5}$. The electrode was covered with wire cloth, 260 × 1550 mesh, to retain the fine 200-mesh powder. The electrode was charged to 100% of theoretical capacity and at a current density of 10 $ma/cm^2$ in molten KCl-LiCl electrolyte. The potential behavior of the electrode was similar to that obtained with $Li_5Si$ alone except for one very short transition plateau between the usual 48 and 15 mv plateaus, possibly due to an impurity.

These results indicate that $FeSi_2$ is preferable to Si alone where negative electrodes are to be built in the uncharged condition. Other benefits may also be derived from this substitution. Also, the presence of iron is considered to improve performance by providing better electronic conduction throughout the active material. The hazard of Si transfer to the supporting ferrous honeycomb structure with consequent embrittlement with time may also be reduced by the use of $FeSi_2$.

EXAMPLE 2

A control test was made in which identical electrodes, one containing $FeSi_2$ (−20 + 60 mesh) and the other, silicon powder (−60 + 100 mesh) were charged with lithium. The electrodes consisted of screen formed of 16-mesh screen covered with a 100-mesh stainless steel screen particle retainer. The sides and back were shielded to confine activity to one face. Each electrode had a theoretical capacity of 3.6 ampere-hours (1.2 $ah/cm^3$) based on the silicon present. The electrodes were charged at 10 $ma/cm^2$, based on an area of 4.8 $cm^2$. The capacity of the $FeSi_2$ electrode was 3.4 ampere-hours after charging. This corresponded to about 95% utilization of the silicon content. The capacity of the electrode containing silicon powder alone was 1.7 ampere-hours, which corresponds to a 49% utilization. The latter figure is in good agreement with the results of previous tests made with honeycomb electrodes filled with silicon powder. Both electrodes were cycled at 60 $ma/cm^2$ for 20 cycles without major changes in the initial results. The specific resistances of these electrodes were surprisingly low 0.4 ohm-cm.

EXAMPLE 3

Tests were made using honeycomb electrodes, 2 in. × 2 in. × 0.25 in. deep, filled with $Li_5Si$ alloy to a specific capacity of 1.07 $ah/cm^3$. These electrodes were evaluated at current densities up to 100 $ma/cm^2$. Tests have been made using an electrode of the same design but filled with $FeSi_2$ to a theoretical capacity of 1.10 $ah/cm^3$ based on the Si content. This electrode was then charged and then cycled at the same current densities used in the earlier test with the $Li_5Si$ alloy. The results obtained in both test series are shown in the following table.

| Current Density $ma/cm^2$ | Percent Utilization ($ah/cm^3$) | |
|---|---|---|
| | $Li_5Si$ | $Li_5(FeSi_2)0.5$ |
| 40 | 80 (0.86) | 91 (1.00) |
| 60 | 71 (0.76) | 85 (0.93) |
| 80 | 63 (0.67) | 80 (0.88) |
| 100 | 59 (0.63) | 75 (0.82) |

It is evident from the foregoing that significantly higher percent utilization and recoverable specific capacities were reached with the lithium-silicon-iron alloy. The specific resistances of the two electrodes were not greatly different, 1.0 ohm-cm for the lithium-silicon-iron electrode vs. 1.3 ohm-cm for the $Li_5Si$ electrode.

EXAMPLE 4

An attempt was made to prepare $CuSi_x$ (50 wt % each) for tests of the type described above as copper silicate could not be purchased readily. The high temperature required for preparation of copper silicide could not be reached, and the product was stratified and variable in composition. An electrode was prepared by enclosing the material in a small wire basket and charging it with lithium in molten KCl-LiCl electrolyte. As many as eight voltage plateaus were observed indicating that many phases were present. Because of the uncertainty about the starting material, another test was started using a mixture of molten lithium metal, silicon, and copper.

A lithium copper silicide composition was prepared by melting a mixture containing 38 wt % of lithium, and 31 wt % of each copper and silicon. The mixture was cooled, ground, and loaded into a small honeycomb electrode measuring 1 in. × ¾ in. × 3/16 in. deep. Only 67% of the theoretical capacity was recovered. When little change occurred over ten cycles, the experiment was terminated.

EXAMPLE 5

Small honeycomb electrodes measuring 1 in. × ¾ in. × 3/16 in. deep were loaded with $TiSi_2$, $MoSi_2$, $MgSi_2$, $CaSi_2$, $CoSi_2$, $CrSi_2$, and $VSi_2$, and electrochemically charged with lithium in the KCl-LiCl eutectic salt. Based on silicon content, utilization of 44, 0, 94, 68, 41, 53, and 60%, respectively, were found at a current density of 20 ma/cm. Only $MgSi_2$ approachhd $FeSi_2$ in percent utilization, but the average electrode potential was reduced considerably in the former case.

The electrode potential behavior of the lithium-calcium silicide mixture was complex with up to eight plateaus appearing on discharge, the more positive one being +380 mv with respect to lithium. At least part of the reduced utilization of the silicon content found in this case appears to result from calcium-silicon bonds which are stronger than those between lithium and silicon.

EXAMPLE 6

The following example illustrates the applicability and utility of the Li-Si-Fe alloy electrode of the present invention when used in an electrical energy storage device as the negative electrode. The electrode utilized was prepared by loading $FeSi_2$ powder into a small honeycomb electrode (1 in. × ¾ in. × 3/16 in. deep). The electrode was covered with wire cloth, 260 × 1550 mesh, to retain the fine powder. The electrode was electrochemically charged with lithium at 10 ma/cm² to a 48 mv voltage plateau; a total of 2.3 ampere-hours capacity was obtained corresponding to 100% utilization of theoretical capacity.

The positive electrode or cathode comprised a honeycomb structure (1 in. × ¾ in. × ¼ in. deep) containing iron sulfide active material which yielded 2.4 ampere-hours theoretical capacity. The electrode was covered with a wire cloth to retain the active material. The anode, cathode, and a boron nitride separator were clamped together to form a compact cell.

The electrical energy device was alternately charged and discharged as 40 ma/cm²; the coulombic efficiency was around 97–99%, thereby demonstrating the efficacy of the lithium electrode of the present invention and the advantages obtainable therewith.

EXAMPLE 7

An uncharged electrochemical bicell consisted of a honeycomb structure (2 in. × 2 in. × 0.25 in.) for the negative electrode and contained 9.34 gm of $FeSi_2$ powder (−60 +100 mesh); a 29.4 gm equimolar mixture of $Li_2S$ and iron powder enclosed in dual honeycomb structures as the positive electrodes; and a $Y_2O_3$ felt as a separator. The molten salt electrolyte was a eutectic mixture of LiCl-KCl. The bicell was made by sandwiching the negative electrode between the above two positive electrodes with $Y_2O_3$ felt separating the electrodes.

The bicell was fully charged at 20 ma/cm², a lithium-silicon-iron alloy corresponding to $Li_4SiFe_{0.5}$ being formed in situ at the negative electrode and iron sulfide being formed at both positive electrodes. This cell was cycled at 13.6-hour rate for at least 19 charge-discharge cycles, achieving 95% coulombic efficiency and 82% energy efficiency.

As may be noted from the foregoing example, the present invention is particularly advantageous in offering the ability to assemble a complete cell with both the negative and positive electrodes initially in the uncharged state and then electroforming in situ. Because of the lesser sensitivity to oxygen and moisture of the uncharged electrodes in the absence of lithium, ease of handling, charging, and fabrication is greatly facilitated. By contrast, starting with an initially discharged condition and forming lithium-silicon negative electrodes by electrochemically charging silicon powder is disadvantageous, since it has been found difficult to utilize more than half of the silicon powder present in the electrode structure.

It will of course be realized that various modifications can be made in the design and operation of the lithium electrode and cell of the present invention without departing from the spirit thereof. Thus, while the lithium electrode structure has been illustrated and described with respect to certain exemplary embodiments relating to particular preferred constructions and materials for the supporting current-conducting matrix electrode structure, and while preferred embodiments of secondary cells utilizing molten salt electrolytes and metal sulfide cathodes have been illustrated and described, it should be understood that within the scope of the appended claims the invention may be practiced otherwise than as specifically illustrated and described.

What is claimed is:

1. A method for electrochemically forming a composite negative lithium electrode structure for an electrical energy storage device from the uncharged state, wherein the formed negative electrode structure comprises a supporting current-collecting matrix in intimate contact with an alloy of lithium, silicon, and iron having the empirical formula $Li_xSiFe_y$, where $x$ has a value from 1 to 5 and $y$ has a value from 0.125 to 1, which includes the steps of:

providing a supporting current-collecting matrix in intimate contact with an alloy of iron and silicon, the iron being present in an amount from about 11 to 50 atom percent and the silicon being present in an amount from about 89 to 50 atom percent;

immersing the current-collecting matrix containing the iron-silicon alloy in a lithium-containing molten salt electrolyte in a cell in opposing relation to a positive electrode structure, and electrochemically charging the iron-silicon electrode structure at a selected voltage or current for a time sufficient to form said lithium-silicon-iron alloy negative electrode structure.

2. The method of claim 1 wherein the positive electrode prior to charging comprises a mixture of lithium sulfide and iron.

3. The method of claim 1 wherein $x$ has a value from 4 to 5 and Fe has a value from 0.125 to 0.5 in the formed negative electrode structure.

* * * * *